(12) United States Patent
Wysocki et al.

(10) Patent No.: US 7,692,851 B2
(45) Date of Patent: Apr. 6, 2010

(54) ARTICLE COMPRISING A SERIES EXPANDABLE ERBIUM-DOPED FIBER AMPLIFIER (SE-EDFA)

(75) Inventors: Paul Francis Wysocki, Flemington, NJ (US); Mitchell Steven Wlodawski, West Caldwell, NJ (US)

(73) Assignee: UNOPSYS, LLC, Flemington, NJ (US)

( * ) Notice: Subject to any disclaimer, the term of this patent is extended or adjusted under 35 U.S.C. 154(b) by 199 days.

(21) Appl. No.: 11/666,825

(22) PCT Filed: Oct. 29, 2005

(86) PCT No.: PCT/US2005/039117
§ 371 (c)(1),
(2), (4) Date: Apr. 30, 2007

(87) PCT Pub. No.: WO2006/050184
PCT Pub. Date: May 11, 2006

(65) Prior Publication Data
US 2008/0123181 A1    May 29, 2008

Related U.S. Application Data

(60) Provisional application No. 60/623,184, filed on Oct. 29, 2004.

(51) Int. Cl.
*H01S 3/00* (2006.01)

(52) U.S. Cl. .................................. 359/337.4; 359/349
(58) Field of Classification Search ............. 359/337.4, 359/349, 341.1
See application file for complete search history.

(56) References Cited

U.S. PATENT DOCUMENTS

| 5,050,949 | A  | * | 9/1991  | DiGiovanni et al. | 359/337.4 |
|-----------|----|----|---------|-------------------|-----------|
| 6,307,668 | B1 | * | 10/2001 | Bastien et al.    | 359/337.1 |
| 6,362,917 | B1 | * | 3/2002  | Cordina et al.    | 359/337.1 |
| 6,396,623 | B1 | * | 5/2002  | Wysocki et al.    | 359/337.4 |
| 7,072,100 | B2 | * | 7/2006  | Nishihara et al.  | 359/337.2 |

* cited by examiner

*Primary Examiner*—Mark Hellner
(74) *Attorney, Agent, or Firm*—Mayer & Williams PC; Stuart H. Mayer

(57) ABSTRACT

A method for increasing the number of channels amplified by an optical amplifier arrangement is provided. The optical amplifier arrangement includes at least one optical amplifier stage amplifying a first number of channels at a given average gain level. The method begins by selecting a second number of channels to be amplified by the optical amplifier arrangement. At least one additional optical amplifier stage is serially coupled to an input or output of the at least one optical amplifier stage to form a multistage optical amplifier arrangement. The gain shape of the multistage optical amplifier is adjusted to maintain, at the given average gain level or greater, a prescribed degree of gain flatness over an operating bandwidth in which the second number of channels are located.

24 Claims, 6 Drawing Sheets

SERIES EXPANSION WITHOUT DCM

SERIES EXPANSION WITH DCM

ARTICLE COMPRISING A SERIES EXPANDABLE ERBIUM-DOPED FIBER AMPLIFIER (SE-EDFA)

STATEMENT OF RELATED APPLICATION

This application claims the benefit of U.S. Provisional Patent Application 60/623,184, filed Oct. 29, 2004, entitled "Article Comprising A Series Expandable Erbium-Doped Fiber Amplifier (SE-EDFA)", which is incorporated herein by reference in its entirety.

FIELD OF THE INVENTION

The present invention relates to the field of optical fiber communication network design. In particular, it relates to amplification in optical fiber networks and to the design of amplifiers in those networks that are easily upgradeable to handle higher system capacity and to minimize the complexity and cost associated with such upgrades.

BACKGROUND OF THE INVENTION

In current optical communication systems, signals are transmitted long distance using multiple wavelengths of light passing through optical fibers. Each optical carrier wavelength (or channel) can be encoded with a unique set of information. The broader the optical bandwidth of the transmission system, the more information can be transmitted using more wavelength-division multiplexed (WDM) signals. Such WDM optical systems use optical fibers, which produce some level of optical loss, typically in the range 0.15-0.3 dB/km. Additionally, components used in these systems to perform signal enhancement or signal processing functions such as dispersion compensation or dynamic equalization, add optical loss. In order to overcome these losses and maintain the optical signal to noise ratio (OSNR) of each channel, optical amplification is required periodically. Such optical amplification must be broadband, at least as broadband as the wavelength range of signals to be transmitted and its gain must be close to constant for all signal wavelengths (gain flat) so that all signals experience nearly the same gain. Additionally, the amplification must not add much noise to the amplified signal, as represented by a low amplifier noise figure (NF).

Unfortunately, the gain of most optical gain media is not flat across a wide range of optical wavelengths. However, gain flatness can be achieved using an optical gain flattening filter (GFF), which is a device that creates a predetermined wavelength-dependent optical loss to perfectly compensate for any gain flatness error. Such a filter is typically placed within an amplifier to achieve gain flatness to some tolerance level.

A characteristic of optical fiber is its optical chromatic dispersion, which is a measure of the difference in propagation speeds of different wavelengths of light in the fibers. Too much dispersion leads to a spreading of pulses and a degradation of the optical signal to noise ratio (OSNR). Too little dispersion can lead to degradation caused by nonlinear optical effects. To tailor the dispersion for optimal performance, systems are often designed containing devices that compensate for dispersion, so that all wavelengths contained in a signal arrive at the receiver at the same time. These dispersion-compensating modules (DCMs) create optical loss and are often added within the system inside the optical amplifier or between stages of amplification, a design decision that is known to advantageously minimize the accumulation of optical noise.

While optical gain is possible in many different gain media, in most currently deployed optically amplified communication systems, the gain medium consists of erbium ions doped into a silica-based fiber. Such Erbium-doped Fiber Amplifiers (EDFAs), when provided with sufficient optical pump radiation from available pump diodes, can provide efficient low noise amplification at the low loss window of optical transmission fibers, namely near 1550 nm. EDFAs can produce gain across a 40 nm window from 1525-1565 nm (called the C-band) or can be designed differently to produce gain from 1565-1605 nm (called the L-band). In both bands, the gain is not adequately flat for most WDM optical communications systems without the inclusion of some filtering, and the shape of the gain varies with operating condition.

As part of the expansion of the information carrying capacity of optical networks, it is necessary to install additional equipment to add capacity to the amplifiers (optical repeaters) in the optical transmission path. This generally will require additional wavelength carrier channels, possibly operating at higher data rates, which need to be amplified within the network optical path. In addition this may require the addition of signal conditioning components such as gain flattening and dispersion compensation to properly handle the larger bandwidth of the network.

Current methods to expand channel capacity in a currently installed system are: 1. New Amplifier Design: Design a new amplifier to handle the higher channel count (and data rates) to replace the lower channel count amplifiers in the network, or 2. Parallel Expansion: Break out the channels into parallel banded regions of the optical spectrum (consisting of 1 to as many as 40 or more channels) Each band can then be amplified by a separate amplifier which is gain flat in a specific narrow band and then the bands can be recombined for transmission in the network. The new design approach is expensive and is customized to each expansion of the channel capacity. Parallel expansion of the channel count means that banded groups of channels must be broken out (de-multiplex) from the transmission path and then each banded group requires a unique amplifier. For example, sub-bands each consisting of 4 channels, and 40 total channels used in the network this means that 10 separate amplifiers are required for a fully utilized network. Such an example of using the parallel band expansion of system channel capacity is shown in FIG. 1. The signals in the network transmission fiber must be demultiplexed into N sub-band groups. Each sub-band group is then amplified independently. As additional capacity is required in the network more sub-band paths are added to the system. Spectral guard bands are generally necessary to avoid interference between sub-bands which means that some of the bandwidth capability of the EDFA's is not used in this approach. The channels must then be recombined (multiplexed) back into the transmission fiber path.

In general the up front costs are high for the banded parallel expansion strategy since the channel breakout for the anticipated capacity of the system is almost always installed when the system is built. Building additional breakout capacity as needed could be even more expensive and add loss (a detriment to NF performance) to the channel paths. In addition the need to design amplifiers for each banded set of channels adds more complexity and cost to the system.

Signal conditioning elements such as DCMs or GFFs are not shown in the example of the parallel approach in FIG. 1. Signal conditioning could be done at the sub-band level, which require that N DCMs and GFFs for a fully utilized system. Signal conditioning that needs to be performed on the transmission fiber level can require an additional amplification stage, adding more cost to the system.

Accordingly, it would be desirable to provide an optical amplifier arrangement that can be expanded to handle additional network capacity that is simpler and less expensive than current approaches.

SUMMARY OF THE INVENTION

Figure 1:
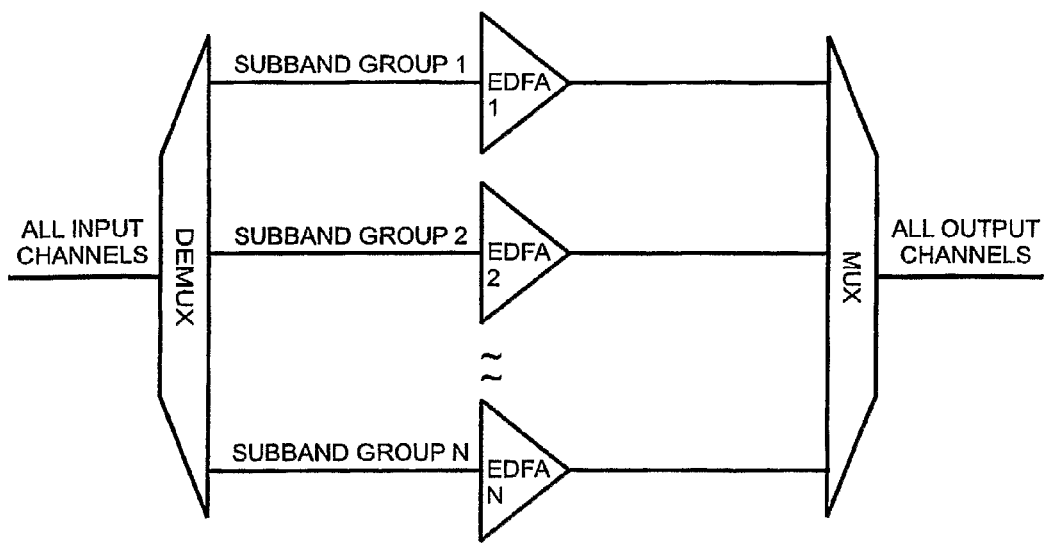
FIG. 1 shows a conventional parallel approach to network expansion in which sub-band groups are added as capacity is needed.

The present invention demonstrates an alternative method for handling network capacity growth that minimizes the up-front costs and uses a pay-as-you-grow strategy for expanding the network channel count. This method involves a serial expansion of the amplifiers in the network by concatenating additional EDFA sections to the existing amplifiers to amplify additional channels without degrading the performance of the existing channels. The method can be appreciated by understanding how to properly cascade amplifiers in series so that increased signal bandwidth can be accommodated without loss of performance, which will be explained in detail below.

One benefit of the invention is the expansion of the information carrying capacity of optical networks. One implementation of the invention is located in the nodes of an optical network. An optical network consists of optical transportation links connected by a set of nodes. For the purpose of this disclosure an optical communication link is defined as a series of optical components connected in series and which make a connection between an optical transmitter and an optical receiver.

The link often consists of a series of spans, that is, lengths of transmission fiber and possibly other passive components separating points of optical or electrical signal regeneration. Such points of signal generation are required because signals experience optical loss in the span fibers and eventually the signal to noise ratio of the signal is inadequate to receive error free transmission. Typically in such networks, spans are 20 km, 40 km, 80 km, 100 km or 120 km in length. For the purpose of this disclosure the points of optical regeneration are one type of network node. A node is defined here as a localized point in a network containing any combination of optical signal conditioning elements such as amplifiers, add/drop modules or passive optical components and being connected to at least 2 span fibers. A node is characterized by a set of optical equipment or components all located within close proximity, often within one small building. For the sake of clarity, the term node as used herein refer to a localized area no more than about 1 km in extent. On this scale the location of amplification stages that are cascaded in series for the purposes of this invention may be located at a single node of the network. Serial cascading of amplifiers described herein will constitute an upgrade of an optical network at the nodes of the network and is not meant to include the links in the network as part of serially cascaded amplifier.

As a preliminary matter it should be noted that the invention may be used in connection with optical amplifiers based on three-level atomic systems (based on doping of rare-earths such as Erbium or Ytterbium into an appropriate glass host) and will not be practical with those based on four levels (for example with Neodymium as a dopant). A three level system consists of two laser levels, an upper laser excited state and a ground state, and with a third level of higher energy than the upper laser level, that acts as an intermediary used to transfer the energy from a pump source into excited ions in the upper laser state. Ytterbium is what can be termed a quasi-three-level system, since it has essentially two energy bands, but the broad nature of the energy bands are such that it has the characteristics of a three level system.

If the relative decay rates between the states are appropriate, then by sufficient optical pumping it is possible to create an inversion of the population of excited state ions relative to ground state ions so that amplification of optical signals with wavelengths corresponding to the energy transition between the upper and lower laser level (the signal band) takes place. In general both the upper level and the lower level (ground state from which the ions are pumped to the intermediate level) are populated and the system has both emission and absorption of optical energy. The fact that there is absorption in the signal band when the system is un-pumped is a distinguishing feature of three-level systems. The method of cascading amplifier stages in series will be effective toward handling more channels, which require more power at the same average gain, since each successive stage adds additional pump energy to overcome the loss (absorption) mechanism that competes with gain in the rare-earth doped medium.

A four-level system has upper and lower laser level states as does the three-level system. However, in the four level systems there are two additional states: one higher energy level that acts as an intermediary for ions pumped from the ground state and a ground state that is at a lower energy level than the lower laser level. The ground state assists in draining the ions out of the lower laser level, thus assuring that an inversion in the ion population between the upper and lower laser levels can be achieved. The fact that there is no ion population in the lower laser state means that there is no absorption mechanism for the signals to be amplified, only emission. This means that for a four level system the pump power can be increased to the single amplifying stage to handle more channels at a higher output power since there is no absorption mechanism to compete for the inversion of ions.

The method for handling channel count growth in an optical network disclosed herein is more cost effective than other currently used methods. This method involves a serial expansion of the amplifier sections to amplify additional channels without degrading the performance of existing channels. In one example of applying this method, a Series-Expandable EDFA (SE-EDFA) can be designed for the largest anticipated channel count, usually comprising several EDFA stages, such that as each stage is "removed" from the "end" of the amplifier, fewer channels can be supported without loss of gain, gain flatness or NF performance. Alternatively, modules can be designed to be added in series with an existing amplifier to add channel capacity while maintaining the performance of the existing channels. Each stage can be built in a modular form with appropriate optical interface to couple directly to the other stages in the amplifier chain (compatible with any plug-and-play approach).

A system designed using a SE-EDFA approach could for example, start with a single stage amplifier which can support a small number of channels (an example of 4 channels is shown below) with optimal performance. As the system capacity demands increase, the amplifiers channel capacity can be expanded by simply adding on an additional module (stage) to the amplifier. The resulting performance is that, for example, the system capacity is now 20 channels while the original channels experience minimal change in performance. The additional amplifier modules, added as channel count increases, require pumps and can accommodate, if necessary, signal conditioning components (either external or built in to the module), such as dispersion compensation modules (DCM) and gain flattening filters (GFF). Similarly the channel count can be expanded to, for example 40, with the addition of another module.

It should be noted that the approach described here is not limited to the case of physically adding a stage to an amplifier operating in the field when new capacity is desired. In reality, even if system capacity will never change in the lifetime of a system, the approach is useful as a cost saving methods. For example, at the beginning of system life it may be anticipated that 33% of the links in the system will support 1 channel, 33% will support 10 channels and 33% will support 40 channels. Then 33% of links could be installed with inexpensive SE-EDFAs with only 1 stage, 33% could be installed with moderate cost SE-EDFAs with only 2 stages, and the remaining 33% of links could be installed with expensive SE-EDFAs with 3 stages. This is a substantially less expensive alternative to installing 3-stage maximum capacity EDFAs in all links.

The fact that EDFAs can be cascaded in a serial fashion, while maintaining specified performance criteria for gain, ripple and NF for an increasing number of channels is not intuitively obvious and has never been previously disclosed. As will be discussed further in the detailed description section below, the equations that govern the gain in an EDFA suggest that adding additional stages to an EDFA while maintaining the same gain will necessarily change the spectrum of the gain and hence alter gain flatness. Our solution to this problem lies in our discovery that, as each amplifier is added in cascade, the combined amplifier can handle more channels (wider bandwidth) while achieving the same average gain (with more total output power), over all channels, and still meet a given set of requirements for gain flatness and NF performance in an optical network. This is exactly suited for expanding the capacity of amplifiers in a network. As capacity needs increase, stages can be cascaded in series with the current EDFAs such that system capacity is increased and the performance over the previously existing channels is maintained. Coupled with the cost advantages as compared to the parallel expansion approach and the compatibility of the series expandable method with a plug-and-play modular approach, the series expandable method becomes attractive for implementation in optical networks.

Figure 2:
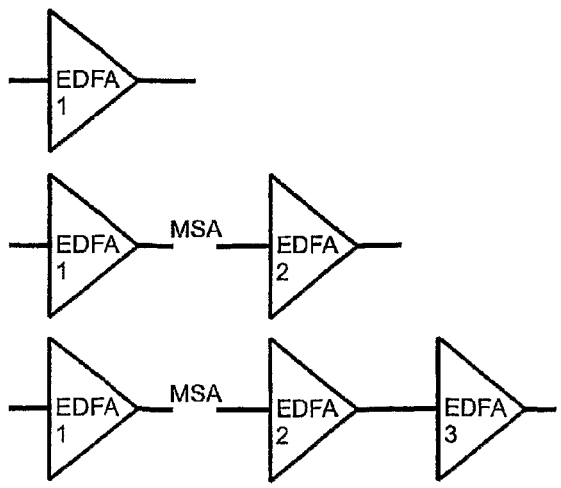
FIG. 2 shows a simplifier block diagram of Series Expandable EDFA (SE-EDFA) in accordance with the present invention.
Figure 2:
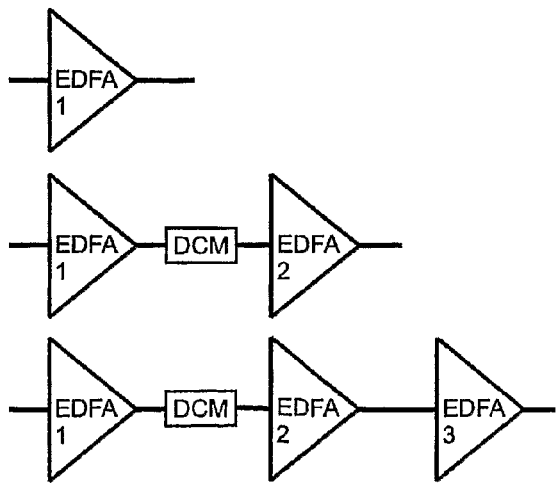

An example of a SE-EDFA design, showing up to 3 total amplifier modules added in series, is shown in FIG. 2. The method is, of course applicable if it becomes necessary to use more than 3 additional stages to meet the needs of the optical network. As each additional EDFA module is added in series to the amplifier, the channel capacity of the repeater is increased. The example shows the possibility of using mid-stage access (MSA) points for the insertion of signal conditioning elements, such as the MSA shown on the right in FIG. 2. In the serial expansion method it is not necessary to "burn" an additional amplification stage in order to introduce signal conditioning (DCM or GFF). Signal conditioning modules can be built into the added stages or added externally as shown in FIG. 2.

Whereas both the serial and parallel methods anticipate channel capacity expansion, the SE-EDFA requires less up front cost (pay as you grow), takes advantage of modular design of an amplifier, and requires less effort creating many unique designs than required for the parallel banded approach. It can also utilize the full bandwidth (no guard bands necessary between parallel bands) capability of the EDFA.

DETAILED DESCRIPTION

In early optically amplified communication systems, erbium-doped fiber amplifiers (EDFA) were used to amplify single channels at a particular optical wavelength in the C-band. It soon became apparent that the gain bandwidth of such EDFAs allowed them to be used to amplify multiple signals simultaneously. This approach is known as wavelength-division multiplexing (WDM) and it is a standard approach in optical transmission systems for most applications, for many system lengths, span lengths and bit rates. The gain spectrum of an EDFA depends on operating condition. In the first approximation, the spectrum can be mathematically computed using the following formula:

$$G(\lambda, \overline{Inv}, l) = [(g^*(\lambda) + \alpha(\lambda))\overline{Inv} - \alpha(\lambda) - BG(\lambda)]l - L(\lambda) \quad (1)$$

where $g^*(\lambda)$ and $\alpha(\lambda)$ are respectively the fully-inverted gain and the uninverted absorption coefficients of the erbium ions in the EDF per unit length, $\overline{Inv}$ is the average ion inversion along the fiber length l, $BG(\lambda)$ is the background loss of the EDF per unit length and $L(\lambda)$ is the sum of all the passive optical loses of all components and all attachment (connector) methods used in the EDFA. This can include any fixed or dynamic filters or VOA's located within the EDFA structure.

Figure 3:
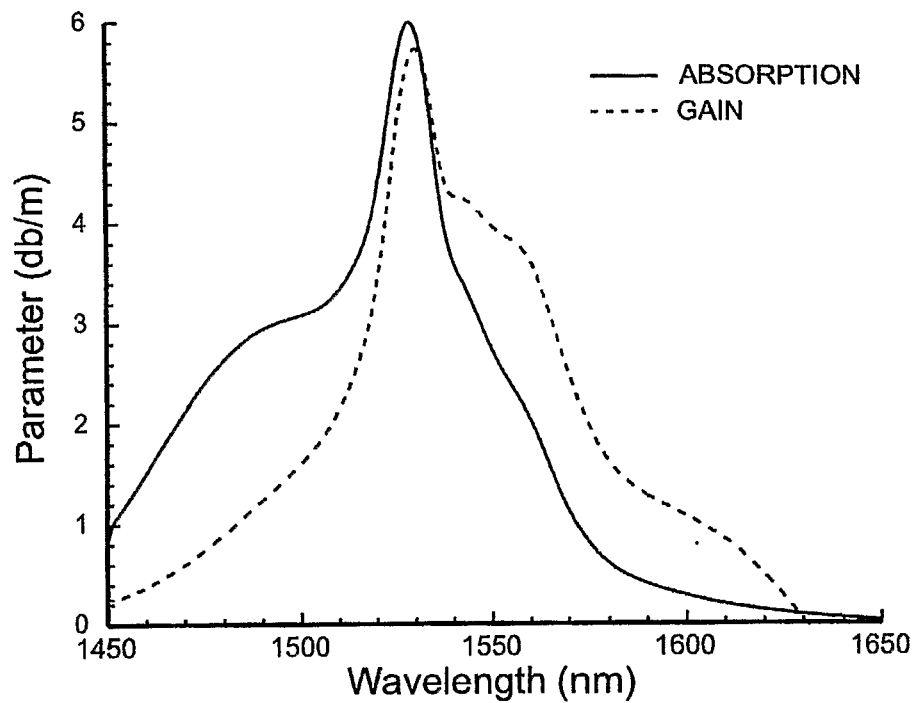
FIG. 3 shows the absorption and gain spectra for erbium doped fiber.

Eq. 1 is generally applicable to any EDFA, no matter how many stages it has and how complex it is, as long as the length used is the total length of all EDF in the EDFA, the average inversion value used is the average across all segments of EDF, the component loss $L(\lambda)$ is the sum for all passive components in the signal path and the fiber parameters $BG(\lambda)$, $g^*(\lambda)$ and $\alpha(\lambda)$ are the same for all EDF segments (the same EDF is used in all segments). The base parameters $g^*(\lambda)$ and $\alpha(\lambda)$ for a typical EDF are shown in FIG. 3. This fiber is a high-aluminum silicate fiber, a composition typically used to produce a flat gain spectrum. $BG(\lambda)$ is typically a low magnitude and nearly wavelength independent quantity that will be neglected here for ease of discussion.

Figure 4:
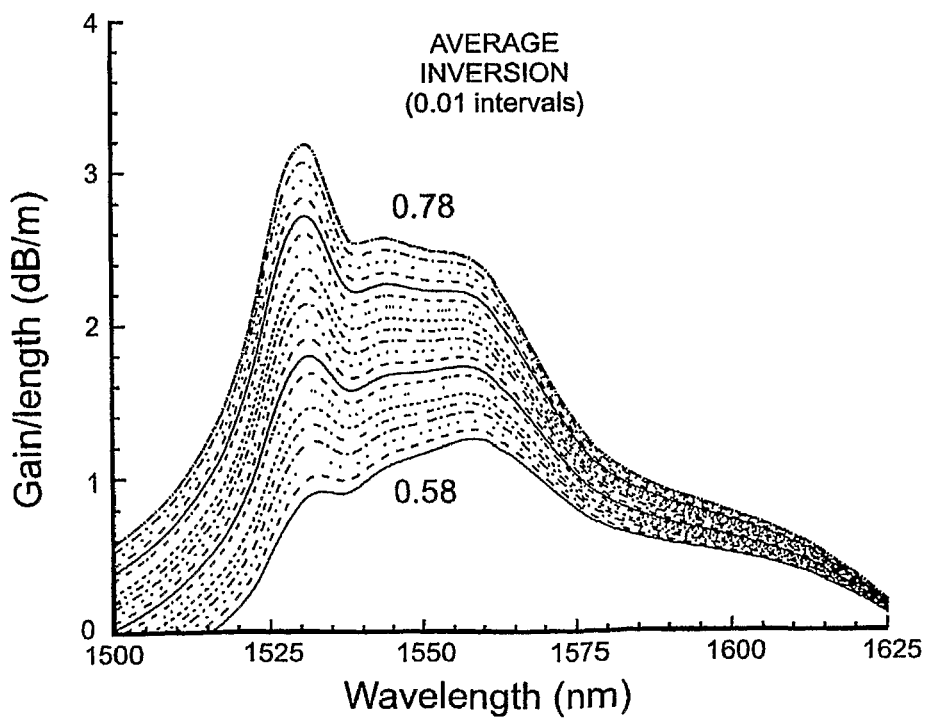
FIG. 4 shows the EDF gain/unit length for a typical range of C-band Operation.
Figure 5:
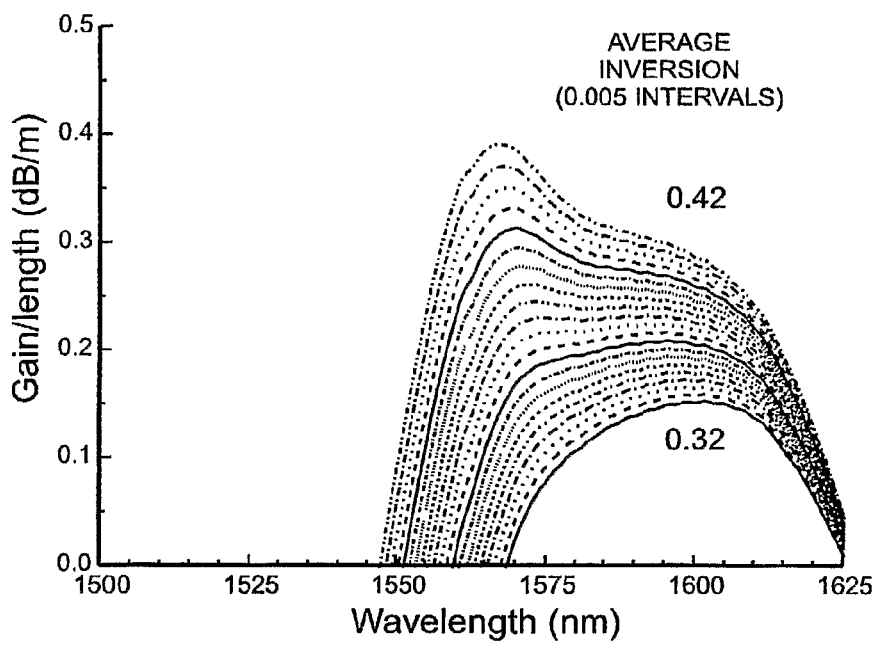
FIG. 5 shows the EDF gain/unit length for a typical range of L-band Operation.

Eq. 1 can be rewritten (neglecting background loss) in a more illustrative form:

$$[G(\lambda, \overline{Inv}, l) + L(\lambda)]/l = (g^*(\lambda) + \alpha(\lambda))\overline{Inv} - \alpha(\lambda) \quad (2)$$

where the left side of the equation represents the EDF gain per length needed to achieve the measured gain $G(\lambda, \overline{Inv}, l)$ with the known component losses $L(\lambda)$. The average inversion of the erbium ions and the effective gain per unit length of the EDFA are linearly related. For the fiber represented by FIG. 3, a plot of the left side of this expression vs. average inversion is shown in FIG. 4 for average inversion levels from 0.58 to 0.78, typically useful values for EDFA operation in the C-band. Similarly, a plot for average inversion levels ranging from 0.32 to 0.42, typical values for EDFA operation in the L-band, is shown in FIG. 5. By changing the average inversion in the EDF (via sufficient optical pumping for example) the gain flatness for a particular region of the spectrum can be made flat to satisfy a given tolerance specified for an optical network. For the C-band, operation near 0.66 average inversion produces the flattest spectrum, while, for the L-band, 0.375 average inversion produces the best flatness. Any EDFA at any gain level can achieve any of these spectra, by simply choosing the length such that FIG. 4 or 5, when multiplied by the length, produces the desired gain.

The discussion below applies equally well to both the C-band and L-band amplifiers, but we will concentrate on C-band to illustrate the general principal of Series Expandable EDFA.

Figure 6:
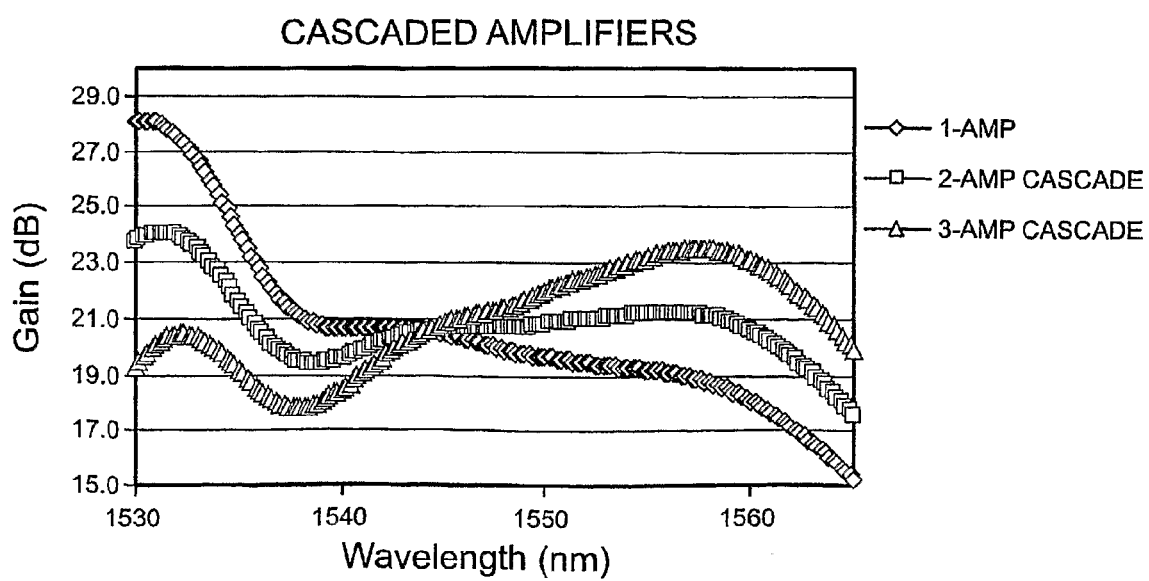
FIG. 6 shows the EDFA gain spectra for 1, 2 and 3 stage SE_-EDFA's with the same average 40 channel gain.

As an example to illustrate the difficulty of cascading amplifiers in series, consider an amplifier consisting of cascades of a single amplifier design which has the following characteristics:

EDF length=8 meters
Total passive loss (including connectors)=3.5 dB
Specified average gain=21 dB The signal band consists of 40 channels in the C-band, at 100 GHz spacing extending from 1530.3 nm to 1561.4 nm. FIG. 6 shows the result of the gain spectrum of a single amplifier and the cascade of 2 and 3 stages, where the average inversion of the EDF is such that the average gain is 21 dB for each case.

The gain shapes are significantly different for the same average gain. The only way to reduce the ripple is to use a gain equalization filter at the output of the amplifier. However, as each amplifier is added to the cascade the filter required to flatten the gain is significantly different in spectral shape. The effect in FIG. 6 is solely due to the fact that an amplifier stage cannot be added without increasing the total erbium length in Eqs. 1 and 2. But then, if the gain is held constant, the spectrum must change as shown in FIGS. 4 and 5.

Figure 7:
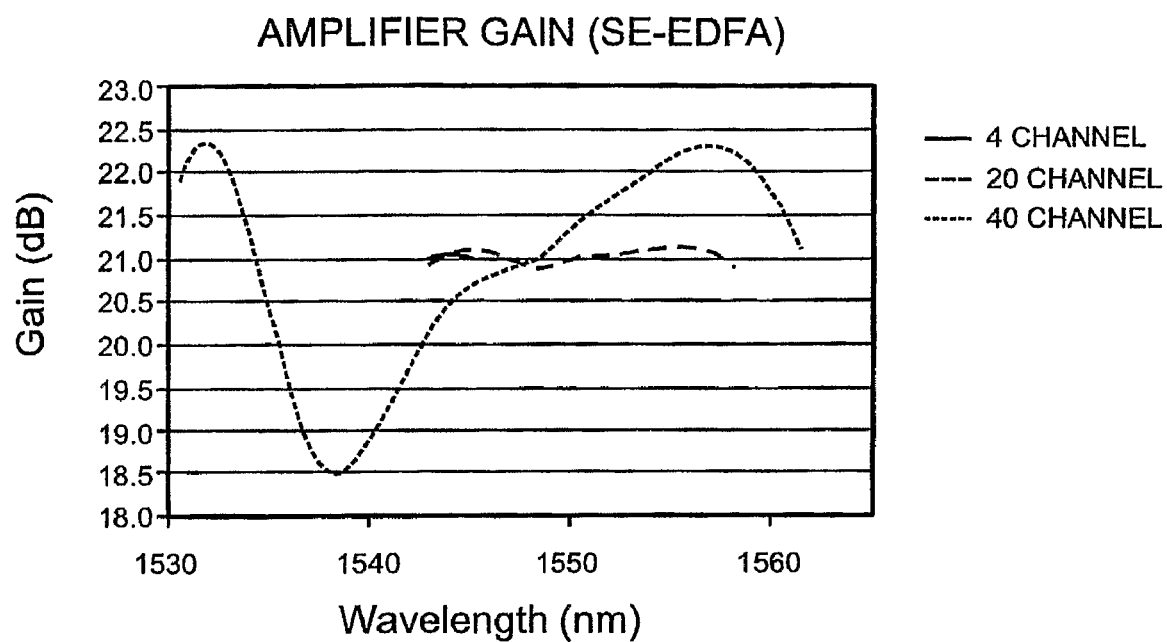
FIG. 7 shows the gain spectra for SE-EDFAs operating with 4-channels (1 amplifier stage), 20 channels (2-amplifier stages), and 40 channels (3 amplifier stages).

What has been revealed by this disclosure is that, if the number of signal channels is changed as each stage is added in the amplifier chain, the gain spectrum for each band can be kept flat to within some tolerance with the same average gain in all cases. As an example of the method, we assume the following three bands are to be amplified by different cascades of amplifier sections:

1542.9-1545.3 nm-1 amplifier
1542.9-1558.2 nm-2-amplifier cascade
1530.3-1561.4 nm-3-amplifier cascade The smallest band supports 4 channels at 100 GHz spacing, while the second band supports 20 channels, including the 4 channels from the smallest band and the largest band would cover 40 signal channels, including the 20 channels from the other bands. The output power must be different as each amplifier is added in series in order to maintain the per channel output power required, but the average gain over the bands of interest are the same, 21 dB and we can design to a specified gain flatness level. The spectrum for the cascades is shown in FIG. 7. It is apparent that the ripple is significantly less than for a situation of trying to keep the entire band flat. The key is to remember that when there are fewer stages in the series cascade the part of the band that is in use is smaller and only that section of the spectrum must be flattened. This is accomplished by designing the amplifier cascades to operate at appropriate average inversion levels. Depending on the gain flatness requirement for the 3-amplifier cascade, a GFF may be used to meet specification.

One degenerate case of a series EDFA that does not meet the needs of most systems is worth noting before proceeding with an example. The additional EDFA stages (stages 2 and 3 in this example) could be designed to be gain flat and produce 0 dB of gain (optical transparency). This can always be accomplished by adding fixed loss within the stage so that the net gain is 0 dB. However, such a design is severely penalized in terms of performance. For example, if the 0 dB stages contained large losses followed by amplification, the loss would contribute to a severe degradation of the overall NF when stages were cascaded. If the 0 dB stages contained gain followed by large losses the pump power in the stage would be required to be large in order to overcome the losses and produce the required output power. So, while a series EDFA with flat 0 dB stages is possible, it suffers from severe degradation in either NF efficiency or both. Such a design is not in the spirit of this disclosure.

The following is an example of an amplifier designed with the SE-EDFA concept according to the present invention.

EXAMPLE

The example outlined below is for a C-band, SE-EDFA that was designed for expandability from 4 channels (single stage), to 20 channels (2-stages) and to 40 channels (3-stages). Table 1 summarizes the design of the amplifier to accommodate different channel counts.

TABLE 1

| | | | Example of SE-EDFA | | | | |
|---|---|---|---|---|---|---|---|
| No. channels | Input Pwr/ch (mW/dBm) | Total Input Pwr (dBm) | Total Output Pwr (dBm) | No. Stages | No. pumps | DCM (10 dB loss) | GFF |
| 4 | 0.0125/−19 | −13 | 11 | 1 | 1 | No | No |
| 20 | 0.0125/−19 | −6 | 18 | 2 | 2 | Yes | No |
| 40 | 0.0125/−19 | −3 | 21 | 3 | 4 | Yes | Yes |

Figure 8:
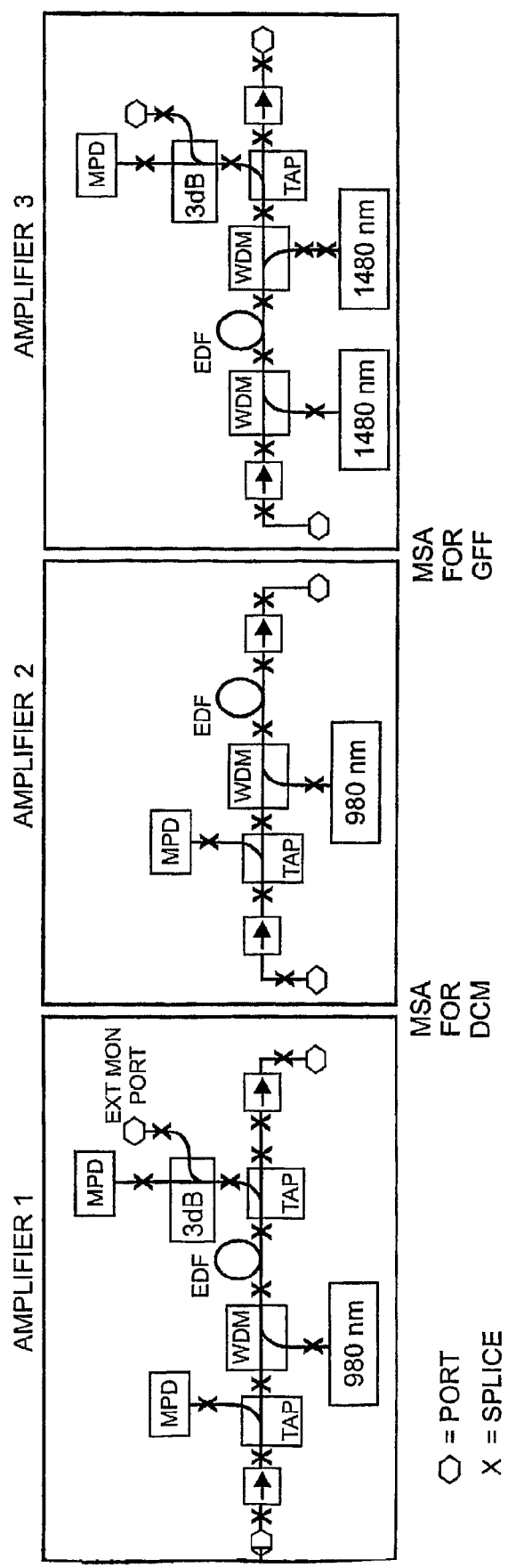
FIG. 8 a block diagram of one example of a 3 stage SE-EDFA in accordance with the present invention.
Figure 9:
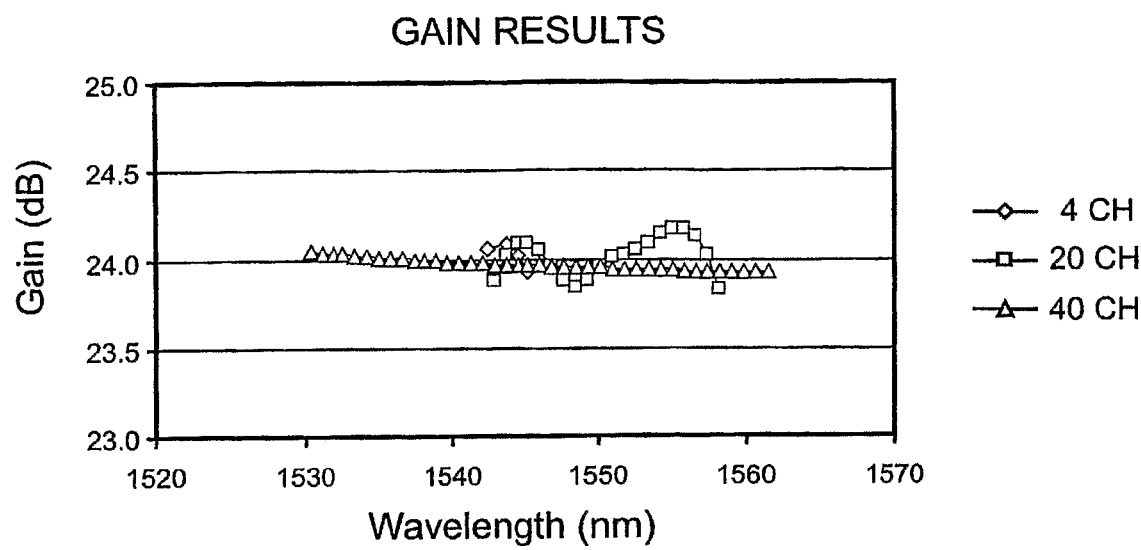
FIG. 9 shows the modeled gain specta for the SE-EDFA shown in FIG. 8.
Figure 10:
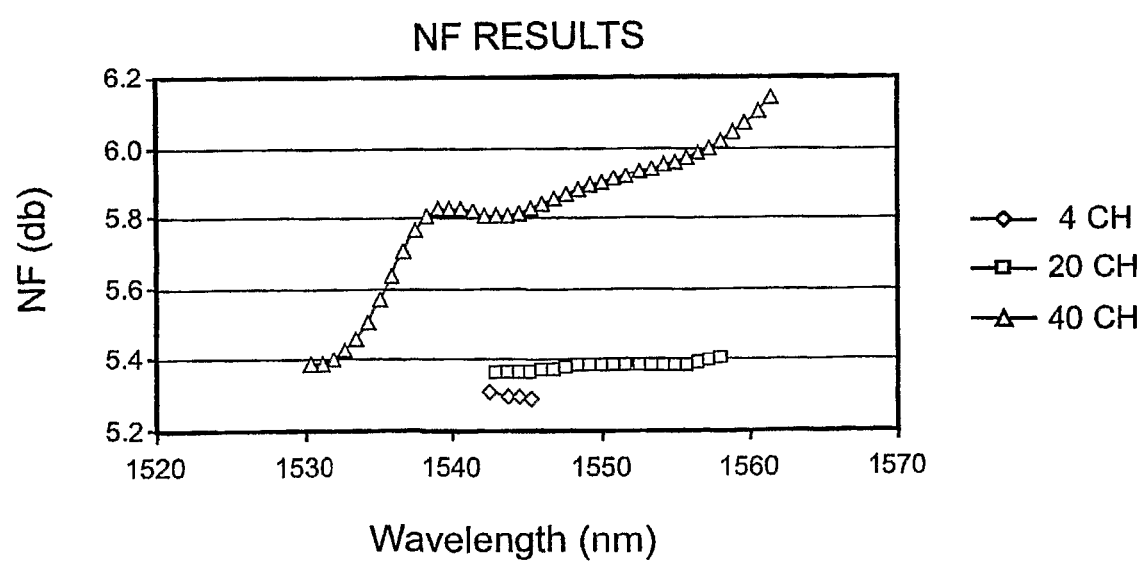
FIG. 10 shows the modeled noise figure (NF) modeled for the SE-EDFA shown in FIG. 8.

The wavelengths selected for this example can be viewed in the plots of gain and NF shown below (see FIG. 9 or 10). The series cascade is shown in FIG. 8 and was modeled using the OASiX amplifier software simulation model available from OFS-Fitel. The expansion from a 4-channel EDFA to the 20 channel EDFA is achieved by mating the second stage (module) to the first stage. A pump and a DCM, either external or built into the second stage module, is used in this example. Similarly the expansion in capacity to 40 channels is achieved by adding an additional stage, requiring, in this example, two 1480 nm pumps. A DCM and GFF are used for the three stage cascade in this example. The DCM and GFF may be part of a module or connected externally at the MSA points as shown.

The plots of gain and NF for all 3 configurations of the SE-EDFA are summarized below in FIGS. 9 and 10. In this example the largest gain ripple is for the 20 channel case (~0.3 dB) and the maximum NF for the 40 channel configuration is ~6.1 dB. The gain ripple is caused by the fact that the 20 channel case does not contain any GFF and so relies on the natural flatness of the EDF over this bandwidth. The NF degrades somewhat when the last stage is cascaded due to the presence of substantial GFF loss before the stage, but is still within an acceptable range for many applications. The 3 stage cascade NF could be reduced if the final stage were pumped at 980 nm, with some loss of efficiency.

In this example it is important to realize the underlying assumptions used in the design. First of all, the gain was to be the same regardless of channel count. Hence, the output power of the 40 channel case is 10× the output of the 4 channel case. This was achieved by proper choice of pump type and power level. Secondly, it was assumed that the goal was to save cost by the approach. Hence, it was deemed valuable to eliminate all GFFs except the one required to meet specifications in the 3-stage cascade. Clearly a GFF could be added in stage 1 or in stage 2 to improve the performance in the 4-channel and 20-channel cases. Finally, it was assumed that each successive cascade must operate well for the channels supported by the cascade with one less stage. Clearly, various options exist that do not support the same channels as stages are added or to change the target gain level to easily achieve flatness.

This invention is based on a unique understanding of the operation of EDFA's assembled in a serial cascade. An important feature of the SE-EDFA lies in its ability to cascade EDFAs in a serial cascade such that the combined amplifier can handle more channels (wider bandwidth) while achieving the same average gain (with more total output power), over all channels, and still meet a given set of requirements for gain flatness and NF performance in an optical network. Although the examples shown in this disclosure have been specific to the C-band and contained no more than 3 stages and used specific types of signal conditioning components, the method is far more general:

- It is applicable to EDFAs operating in either the C-band or L-band.
- The number of EDFA stages that can be added in cascade is not limited to three.
- Different numbers of channels can be added to an optical network other than the 4, 20 and 40 channel series expansion example shown herein.
- Different specific channel bands can be used within the C or L-band
- The channel spacing and data rate can be different.
- The serial method can use signal conditioning components if they are necessary, but they also may not be necessary to build a SE-EDFA that meets the gain, gain flatness, and NF to satisfy the performance needs of a given network.
- The types of signal conditioning components are also not limited to the specific examples shown in the examples (DCM and GFF). Any other type of component is compatible with this method (e.g. dynamic gain equalizer, polarization controller). Signal conditioning components may be employed in whatever configuration necessary to provide the best performance for the optical network.
- The approach is not limited to the type of EDF described.
- In addition to Erbium-doped Fiber Amplifiers, the series expandable method is applicable for cascading optical fiber amplifiers that are made with optical fiber doped with three level rare-earth elements other than Erbium. Many such amplifiers are described by similar gain equations to the EDFA equations and are similarly difficult to cascade in series with constant gain.
- The method is applicable to optical fiber amplifiers operating in bands other than just the C-band or L-band. An example is Thulium-doped optical fiber amplifiers operating in the S-band.
- The approach can be used at many power levels.
- The choice of pump wavelength and configuration may be different than shown in the example.
- The method is applicable to serial cascades of optical fiber amplifiers, each of which can be made with different rare-earth doping the optical fiber and with different concentrations of the doping elements.
- The method is compatible with optical networks that use combined Raman amplification with rare-earth-doped series expandable optical fiber amplifiers.
- The method may be applicable to series cascades of any type of optical amplifiers that can be cascaded in series.
- The method is applicable to erbium-doped waveguide amplifiers (EDWAs) in which erbium is added to the core of an optically guiding structure on a planar substrate. Clearly, doping erbium into any other structure is also encompassed by the invention.
- The serially cascaded amplifier stages may impart either an increased gain or a decreased gain to the channels provided that the NF and output power meet the network performance specifications.

In the 3-amplifier SE-EDFA example shown in the article the best gain flatness was achieved over the appropriate bandwidth at each of the cascade combinations by adjusting the average inversion of the EDF in the particular cascade. When all of the amplifiers are included in the series cascade, which in general will amplify the largest signal bandwidth, it may be advantageous to design the amplifiers to operate within the specified average inversion level ranges mentioned in the detailed description above.

One other embodiment of the invention is worthy of note. It may be possible in some instances to use the exact same design for each stage of a SE-EDFA. The following characteristics constitute a design:

- the choice of pump unit (max power and wavelength)
- EDF length and type
- Configuration of passive components and pumps
- Type of passive components including GFF In such a case, the same stage design may be cascaded in series and controlled to produce the same gain for different numbers of channels. It is not implied that each stage operates in the same operating condition to meet the specifications, only that the same components are configured in the same way. For example, the pump power might be changed or each stage might contain a differently adjusted VOA or DGE. Generally, this is a difficult mode of operation but, in certain cases with certain specifications, it may be possible to cascade the same stage design several times and meet all of the same specifications with different channel counts.

The invention claimed is:

1. A method for increasing the number of channels amplified by an optical amplifier arrangement that includes at least one optical amplifier stage amplifying a first number of channels at a given average gain level, comprising:

selecting a second number of channels to be amplified by the optical amplifier arrangement;

serially coupling at least one additional optical amplifier stage to an input or output of the at least one optical amplifier stage to form a multistage optical amplifier arrangement; and adjusting a gain shape of the multistage optical amplifier to maintain, at the given average gain level or greater, a prescribed degree of gain flatness over an operating bandwidth in which the second number of channels are located.

2. The method of claim 1 wherein the second number of channels is greater than the first number of channels.

3. The method of claim 1 wherein the second number of channels includes at least some of the first number of channels.

4. The method of claim 1 wherein the second number of channels includes the first number of channels.

5. The method of claim 4 wherein the operating bandwidth in which the first number of channels and the second number of channels are located is the same as an operating bandwidth in which the initial number of channels are located.

6. The method of claim 4 wherein the operating bandwidth in which the first number of channels and the second number of channels are located is greater than an operating bandwidth in which the first number of channels are located.

7. The method of claim 1 wherein the adjusting step further comprises the step of maintaining a noise figure within a specification.

8. The method of claim 1 wherein the prescribed degree of gain flatness is about equal to a specified level of gain flatness of the at least one optical amplifier stage when amplifying the first number of channels, wherein the specified level of gain flatness is defined over an operating bandwidth in which the first number of channels are located.

9. The method of claim 1 wherein at least a selected one of the optical amplifier stages comprises a three-level rare-earth doped gain medium.

10. The method of claim 1 wherein the at least one optical amplifier stage and the additional optical amplifier stage each comprise a three-level rare-earth doped gain medium.

11. The method of claim 10 wherein the three-level rare-earth doped gain media are the same for both stages.

12. The method of claim 11 wherein both stages have a common three-level rare-earth dopant concentration.

13. The method of claim 11 wherein both stages have a different rare-earth dopant concentration from one another.

14. The method of claim 10 wherein the rare-earth doped gain media are different for both stages.

15. The method of claim 1 wherein at least a selected one of the optical amplifier stages comprises a doped fiber.

16. The method of claim 1 wherein at least a selected one of the optical amplifier stages comprises a doped planar waveguide.

17. The method of claim 15 wherein the doped fiber is doped with erbium.

18. The method of claim 16 wherein the doped planar waveguide is doped with erbium.

19. The method of claim 1 wherein one of the optical amplifier stages is doped with erbium and the other stage is doped with a three-level rare-earth element other than erbium.

20. The method of claim 1 wherein the at least one optical amplifier stage and the additional optical amplifier stage are of the same design.

21. The method of claim 1 wherein the at least one optical amplifier stage and the additional optical amplifier stage are of different designs.

22. A method for making an optical amplifier arrangement, comprising:

providing at least one optical amplifier stage amplifying a first number of channels at a given average gain level;

selecting a second number of channels to be amplified by the optical amplifier arrangement;

serially coupling at least one additional optical amplifier stage to an input or output of the at least one optical amplifier stage to form a multistage optical amplifier arrangement; and adjusting a gain shape of the multistage optical amplifier to maintain, at the given average gain level or greater, a prescribed degree of gain flatness over an operating bandwidth in which the second number of channels are located.

23. An optical amplifier arrangement constructed in accordance with the method of claim 22.

24. In an optical transmission network that includes a plurality of network nodes interconnected by optical transmission links that initially support a first number of channels, a network node comprising:

at least one optical amplifier stage amplifying the first number of channels at a given average gain level with a prescribed level of gain flatness over an operating bandwidth of the first number of channels, said prescribed level of gain flatness being specified by a predefined network requirement;

at least one additional optical amplifier stage serially connected to an input or output of the at least one optical amplifier stage to form a multistage optical amplifier arrangement within the network node amplifying a second number of channels to be supported by the optical transmission links; and wherein said multistage optical amplifier has a gain shape that maintains, at the given average gain level or greater, said prescribed degree of gain flatness over an operating bandwidth in which the second number of channels are located.

* * * * *